May 3, 1938. J. D. CRECCA ET AL 2,115,707
PORTABLE DEVICE FOR END WELDING
Filed Jan. 13, 1934 3 Sheets-Sheet 2
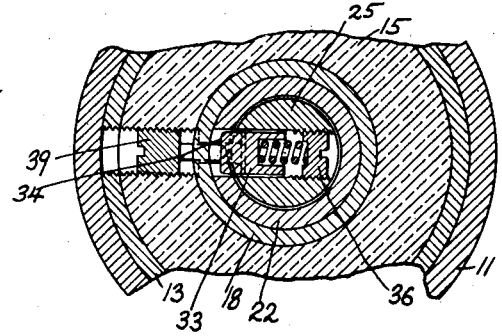
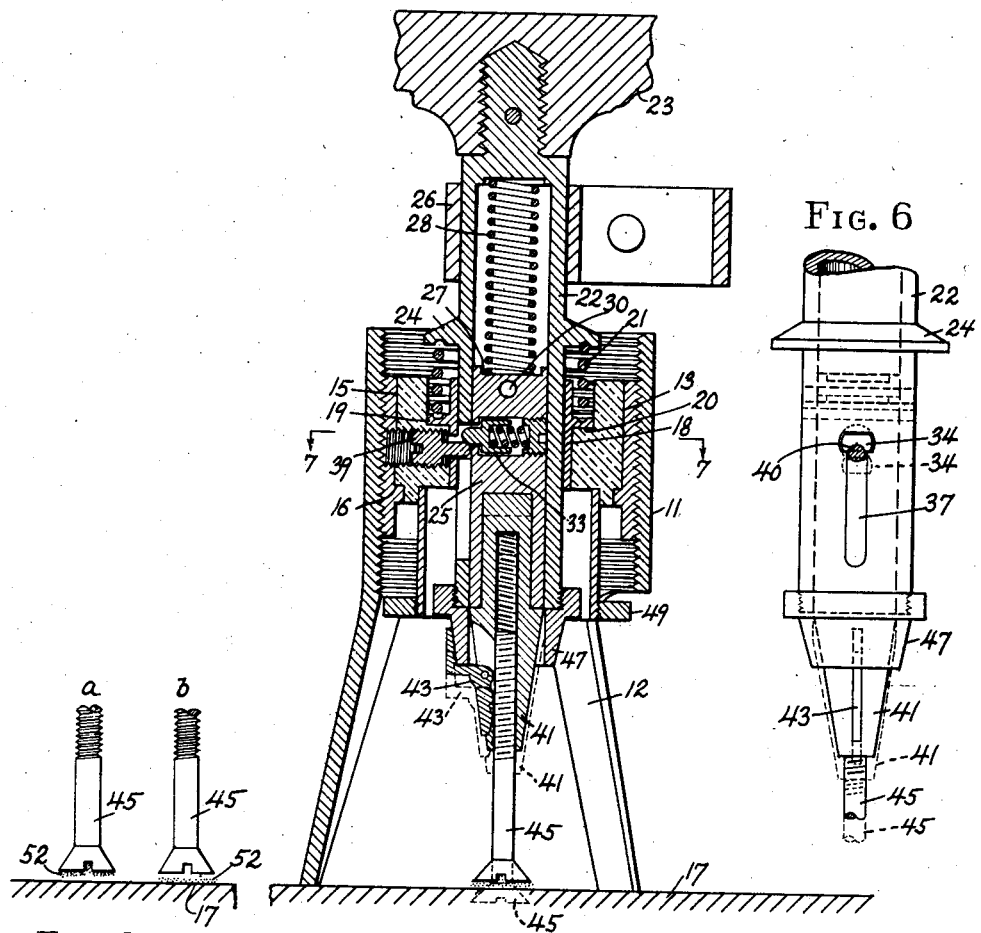
INVENTORS
J. D. Crecca
BY S. S. Scott
ATTORNEY May 3, 1938.　　　J. D. CRECCA ET AL　　　2,115,707
PORTABLE DEVICE FOR END WELDING
Filed Jan. 13, 1934　　　3 Sheets-Sheet 3
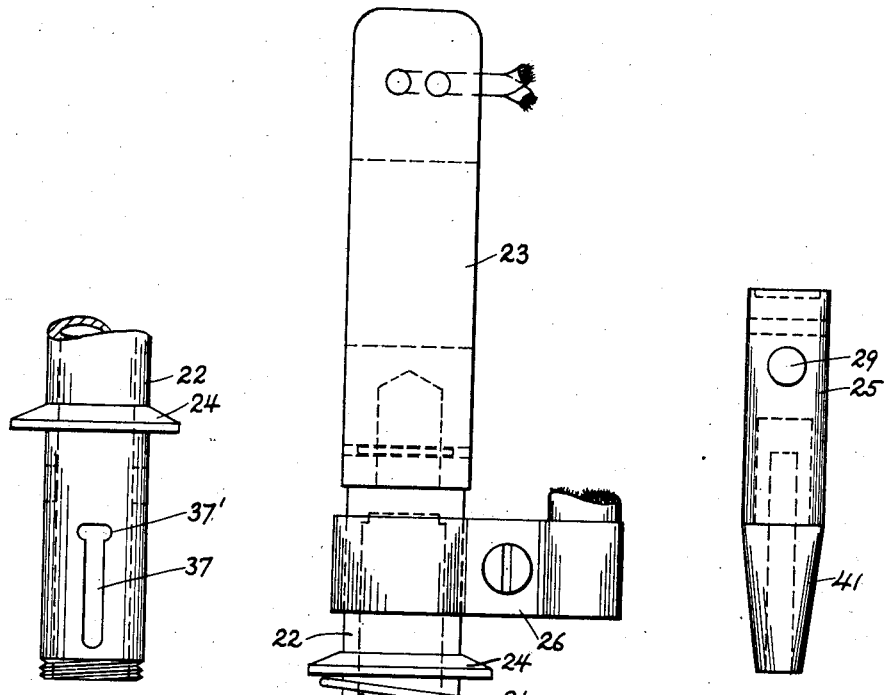
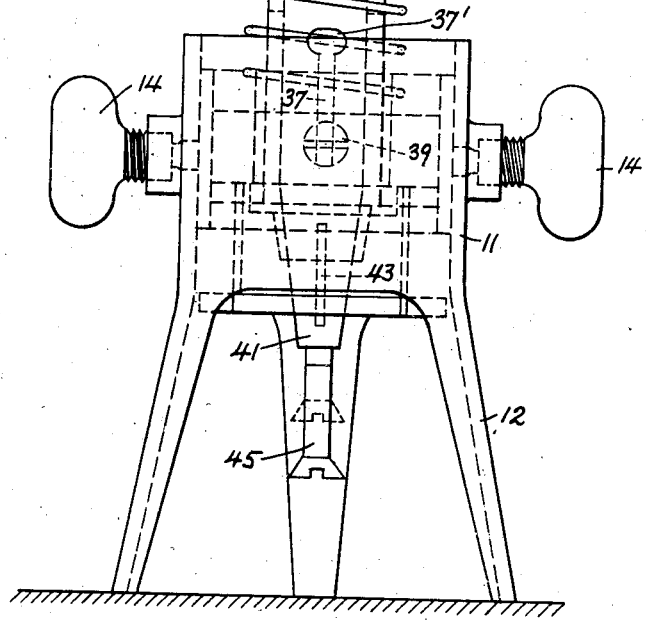
FIG. 8　　　FIG. 9
FIG. 3
INVENTORS
J. D. Crecca
BY S. S. Scott
Harold Dodd
ATTORNEY Patented May 3, 1938

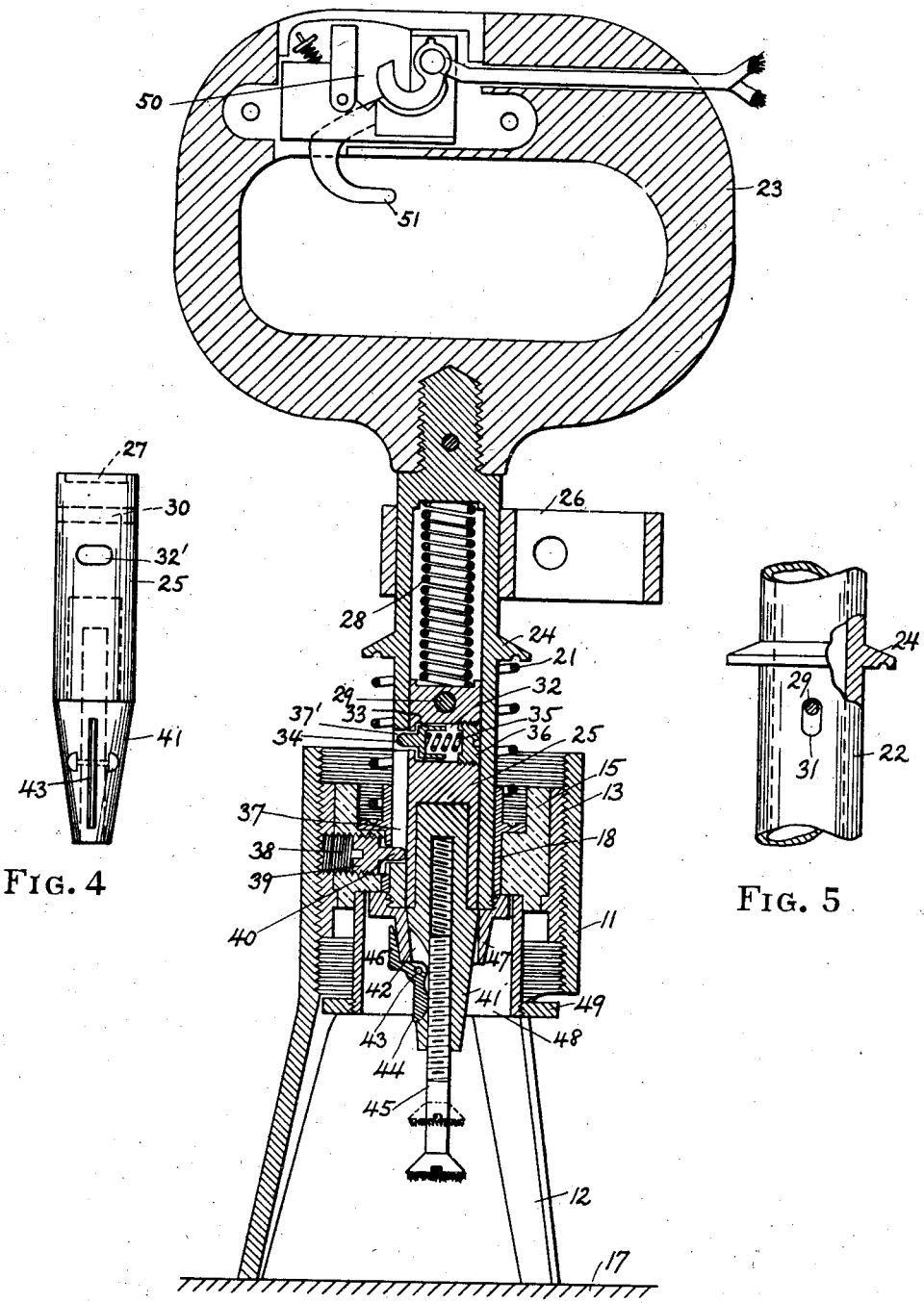

2,115,707

UNITED STATES PATENT OFFICE 2,115,707

PORTABLE DEVICE FOR END-WELDING

John D. Crecca, United States Navy, and Samuel S. Scott, St. Albans, N. Y.

Application January 13, 1934, Serial No. 706,509

25 Claims. (Cl. 219—4)

(Granted under the act of March 3, 1883, as amended April 30, 1928; 370 O. G. 757)

This invention relates to mechanism for electrically welding the ends of elongated pieces of metal, such as studs, bolts or screws, to another piece of metal such as the steel deck of a ship.

Among the objects of this invention are:

To provide a device of the type specified having means to indicate to the operator when the end of the piece serving as one electrode is positioned at the proper arc distance from the surface to which it is to be bonded;

To provide an end welding apparatus having means for mechanically moving the electrode into contact with the surface to which it is to be joined after the parts are suitably heated;

To embody such a device in a construction that is readily movable over a job to do the work with rapidity and facility.

In the drawings:

Fig. 1 is a vertical section through the axis of the electrode holder and the parts associated therewith, showing such parts in the positions occupied by them when the electrode is inserted into the electrode holder;

Fig. 2 is a sectional view taken on the same plane as Fig. 1 but illustrating the positions of the parts when the electrode is at the correct arc distance from the surface to which the electrode is to be welded;

Fig. 3 is a side elevational view of our invention taken at right angles to the plane of Fig. 1;

Figs. 4, 5, 6, 8 and 9 are detail views of the electrode holder and the parts immediately associated therewith;

Fig. 7 is a transverse sectional view on line 7—7 of Fig. 2;

Fig. 10 shows two methods of applying a material for initiating the arc while the electrode remains spaced from the surface constituting the other electrode.

Our present invention is broadly similar to that shown in our copending application Serial No. 706,510 filed January 13, 1934, since matured into Patent No. 2,057,670, dated Oct. 20, 1936, and is well adapted to practice the method therein disclosed. However, the device shown herein has a greater range of usefulness as it is of lighter weight and may be used for welding above the head of the operator and with the mechanism horizontal or at various other angles, whereas the welding machine forming the subject of our said copending application is heavier and is not applicable except where the surface upon which it is used is substantially horizontal.

The supporting structure of our present invention comprises a body 11 mounted upon legs 12, which legs rest against the surface to which the piece is to be welded. A member 13 is adjustable longitudinally in the body 11. As shown, 13 is in threaded engagement with the body and is held against casual rotation by set screws 14, but obviously other means of holding member 13 in the body 11, such as splitting the body longitudinally and applying a clamping device to contract the body upon member 13, may be used. An insulating bushing 15 is supported in member 13 on an annular rib 16 that extends inwardly from the member 13; this bushing prevents the short-circuiting of the electrode holder through the member 13, body 11 and legs 12 which are in electrical contact with the plate or other body 17 to which the piece carried by the electrode holder is to be welded and which body is connected to one side of the welding circuit.

A metal sleeve 18 is disposed in the bushing 15 and has an annular flange 19 extending outwardly therefrom that supports the sleeve in bushing 15 upon a shoulder 20 formed in the bushing and also acts as an abutment for one end of spring 21. Slidably disposed in the sleeve 18 and in snug fitting contact therewith is a hollow cylindrical shank 22, to the upper end of which the handle 23 is secured, which has an annular flange 24 forming the abutment for the other end of spring 21. Within the cylindrical bore of shank 22 the member 25 is slidable with a sufficiently close fit to carry to the electrode holder the current supplied to shank 22 through the cable connected to said shank by clamp 26 without appreciable arcing. A cylindrical recess 27 is formed in the upper end of member 25 and a spring 28 has one end seated therein and its other end seated against the closure at the top of the bore in shank 22. Pin 29 is passed through hole 30 in member 25 and has its ends disposed in slot 31 in shank 22 to limit the longitudinal movement of member 25 in shank 22 and to prevent rotation of member 25. A cylindrical chamber 32 is formed in member 25 substantially along a diameter thereof, the opening into the chamber through one wall of member 25 being of reduced size and substantially oval as shown in Fig. 4 and indicated by reference numeral 32'. Within chamber 32 is seated a detent 33 having a lug 34 that extends through the aperture 32', the detent being urged outwardly by a spring 35 under compression between the detent and plug 36 screwed into the wall of chamber 32. A longitudinal slot 37 is formed in shank 22 and has a transversely widened upper portion 37' with which the aperture 32' may be brought into registry to permit the lug 34 to be projected therethrough and so lock member 25 against longitudinal movement in shank 22. A threaded cylindrical passage 38 is formed through member 13 and insulating bushing 15 and a plug 39 is screwed therein to dispose the finger 40 of plug 39 in the slot 37 to contact lug 34 and unlock the member 25 from shank 22 when the shank is slid downwardly through sleeve 18 to move the electrode against the plate 17.

Electrode holder 41 is secured in the lower end of member 25. Pivotally mounted in a slot 42 in the electrode holder is a bell crank lever 43 having an arm 44 that bears against electrode 45 and a second arm 46 that has wedging engagement with the sloping outer surface of a skirt 47 secured to the lower end of shank 22. It will be noted that the upper portion of skirt 47 extends outwardly from shank 22 for some distance, which prevents access of fumes, moisture and dirt to the contacting surfaces of shank 22 and sleeve 18. A sleeve 48 is secured to the lower end of bushing 15 and carries an outwardly extending annulus 49 that deflects fumes from the arc and also particles of molten metal from the inner surface of body 11.

For convenience of manipulation a switch, designated generally by 50, having an operating trigger 51, is disposed in handle 23; this switch may either control an auxiliary circuit that actuates a relay to close the welding circuit or it may be connected in the welding circuit, but the former is preferable due to the greater safety in having a smaller current carried thereby.

We have found that much more satisfactory work is done with devices of this kind if the free end of the electrode is positioned at the correct arc distance from the surface to which it is to be welded and there maintained while the arc is struck and the metal is heated to the welding temperature. The striking of the arc is accomplished by disposing between the end of the electrode and body 17 a small quantity of a mixture of steel chippings and aluminum filings, indicated in the drawings by numeral 52, which material may be either placed on plate 17 as shown in Fig. 10(b), or it may be caused to adhere to the free end of the electrode by means of glue, glycerine, etc., as in Fig. 10(a). When this material is so used the arc is struck as soon as the welding circuit is closed.

The operation of our device is as follows: Member 13 is adjusted in body 11 at the proper position for the length of electrode that is to be used. The action of spring 21 moves shank 22 upwardly until skirt 47 contacts the bushing 15. Electrode 45 is inserted in electrode holder 41 and pushed upwardly until the end of the electrode seats against the closed end of the bore in the electrode holder, the bell crank lever 43 swinging freely to permit the insertion of the electrode. The electrode and electrode holder are then pushed upwardly against spring 28 until lug 34 snaps into the upper portion 37' of slot 37. This upward movement of the electrode holder causes arm 46 of bell crank lever 43 to wedge against skirt 47 and clamp the electrode firmly in the electrode holder. The operator then pushes down upon handle 23, which slides shank 22 and the parts carried therein downwardly, until retarded by lug 34 coming in contact with finger 40, which indicates to the operator that the free end of electrode 45 is at the correct arc distance from surface 17. The parts are held in this position while the welding circuit is closed by means of switch 50 whereupon the particles of material 52 move to short circuit the gap and the arc is immediately established. After an instant's delay to permit heating of the metal, the operator pushes down on handle 23 sufficiently to cause finger 40 to release lug 34 from aperture 37', whereupon the spring 28 snaps the electrode 45 against the molten metal at the other end of the arc on surface 17 and switch 50 is opened to break the welding circuit. The parts are held in this position for a moment to permit solidification of the heated parts and then the pressure on handle 23 is released which permits spring 21 to move shank 22 and electrode holder 41 upwardly; due to the fact that when the electrode is moved by spring 28, as above described, arm 46 of bell crank lever 43 is disengaged from skirt 47, the lever 43 no longer exerts a clamping pressure upon the electrode and consequently the electrode holder slips freely off the electrode.

The dotted line indications of electrode holder 41 and electrode 45, in Figs. 2 and 6 show the positions of these elements when the electrode has been thrust against the body 17 by spring 28. If direct current is used a crater will be formed in body 17, which is connected to the positive side of the welding circuit, and the end of electrode 45 will be pushed into the crater. If the welding current is alternating the portion of body 17 adjacent the end of the electrode will be fused and the electrode will be thrust into the molten metal.

The invention herein described may be manufactured and used by or for the Government of the United States of America for governmental purposes, without the payment of any royalty therefor.

We claim:

1. A welding device, comprising a supporting structure having an internally threaded portion, an externally threaded sleeve engaged with said portion, said sleeve having an internal annular rib, an insulating bushing in said sleeve having a shoulder bearing on said rib, a protective skirt connected to and extending from the lower edge of said bushing, a guide bushing mounted in said insulating bushing, a plunger cylinder slidable in said guide bushing, a plunger slidable in said cylinder, an electrode holder fixed to the lower end of said plunger, means in said cylinder tending to urge the plunger out of the cylinder, means to limit the movement of the plunger in the cylinder, releasable means to hold said plunger in a given position in the cylinder, means carried by said insulating bushing to trip said releasable means at a predetermined position of the cylinder in the guide bushing, a spring acting upon the cylinder and the insulating bushing to move the cylinder upwardly, means to carry current to the cylinder, a manipulating portion secured to the upper end of the cylinder and means mounted on said portion to control the supply of current to the cylinder.

2. A welding device, comprising a supporting structure, a longitudinally movable element mounted therein, an insulating bushing supported in said element, a guide bushing mounted in said insulating bushing, a cylinder having one end closed slidably mounted in said guide bushing, a plunger slidable in said cylinder, an electrode holder carried by said plunger, means in said cylinder tending to urge said plunger out of said cylinder, means to limit the movement of said plunger in said cylinder, releasable means to hold the plunger in a given position in said cylinder, means carried by said insulating bushing to trip said releasable means at a predetermined position of said cylinder in said guide bushing, continuously acting means tending to move said cylinder upwardly, and means to supply current to said electrode holder.

3. A welding device, comprising a supporting structure, longitudinally adjustable mounting means carried thereby, a cylinder mounted for longitudinal sliding movement in said means, there being through the wall of said cylinder a longitudinal slot with its upper end enlarged, continuously acting means tending to move said cylinder in one direction in said means, a plunger slidable in said cylinder, an electrode holder carried by said plunger, continuously acting means tending to move said plunger out of said cylinder, means to limit the movement of said plunger in said cylinder, a spring-actuated detent in said plunger adapted to seat in the enlarged end of said slot when brought into registry therewith, a finger carried by said mounting means extending into said slot to move said detent out of said enlarged end when brought into contact therewith, and means to lock an electrode in said electrode holder.

4. A welding device, comprising a supporting structure, longitudinally adjustable mounting means carried thereby, a cylinder mounted for longitudinal sliding movement in said means, a plunger slidable in said cylinder, an electrode holder carried by said plunger, means to move automatically said plunger with respect to said cylinder at a predetermined point of the movement of said cylinder in the mounting means, means to supply current to said electrode holder and means supported by said cylinder to control said current.

5. A welding device, comprising a supporting structure, an electrode holder, means movably mounted in said structure by which said electrode holder is carried and by which said holder may be positioned at a distance from a piece of work equal to the length of the desired arc between an electrode in said holder and said work, and means automatically to move said holder to bring the electrode carried thereby into contact with said work upon movement of said means to a predetermined position.

6. A method of end-welding an elongated piece of metal to a flat surface, comprising the steps of placing a small quantity of comminuted metal on said surface at the situs of the weld, disposing said elongated piece with an end thereof spaced from said situs a distance equal to the length of the desired arc between said surface and said piece while preventing the establishing of a solid conducting path between said piece and said surface before formation of the arc, applying an electric potential between said piece and said surface to form an arc and heat the metal at both ends of the arc and then pressing the heated end of said piece against the heated portion of said surface.

7. A method of end-welding an elongated piece of metal to a flat surface, comprising the steps of causing a quantity of comminuted metal to adhere to an end of such piece, disposing said end of said piece at a distance equal to the length of the desired arc from a flat surface to which the said piece is to be end-welded and opposite the situs of the weld while preventing the establishing of a solid conducting path between said piece and said surface before formation of the arc, applying an electric potential between said piece and said surface to form an arc and heat the metal at both ends of the arc and then pressing the heated end of said piece against the heated portion of said surface.

8. A method of end-welding an elongated piece of metal to a flat surface, comprising the steps of disposing an end of such piece at a distance from the situs of the weld equal to the length of the desired arc with comminuted magnetic metal interposed between said end and said surface in contact with one of the bodies to be welded, applying an electric potential between said piece and said surface to form an arc and heat the metal at both ends of the arc and then pressing the heated end of said piece against the heated portion of said surface.

9. A method of end-welding an elongated piece of metal to a flat surface, comprising the steps of placing a small quantity of arc-initiating material on said surface at the situs of the weld, disposing said elongated piece with an end thereof at a distance from said situs equal to the length of the desired arc to strike an arc between said surface and said piece, applying an electric potential between said piece and said surface to form an arc and heat the metal at both ends of the arc and then pressing the heated end of said piece against the heated portion of said surface.

10. A method of end-welding an elongated piece of metal to a flat surface, comprising the steps of disposing an end of such piece at a distance from the situs of the weld equal to the length of the desired arc with arc-initiating material interposed between said end and said surface in contact with one of the bodies to be welded, applying an electric potential between said piece and said surface to form an arc and heat the metal at both ends of the arc and then pressing the heated end of said piece against the heated portion of said surface.

11. A method of end-welding an elongated piece of metal to a flat surface, comprising the steps of disposing an end of such piece at a distance from the situs of the weld equal to the length of the desired arc with a small quantity of intermingled steel chippings and aluminum filings interposed between said end and said surface in contact with one of the bodies to be welded, applying an electric potential between said piece and said surface to form an arc and heat the metal at both ends of the arc and then pressing the heated end of said piece against the heated portion of said surface.

12. A method of striking an arc between electrodes maintained in spaced apart relation until after the arc is struck which comprises disposing between said electrodes and in contact with one thereof particles of ferrous material intermixed with particles of aluminum and then applying potential to the two electrodes, whereby said particles move to short circuit the gap between the electrodes and causes an arc to be established.

13. A method of striking an electric arc while maintaining the end of the electrode spaced from a surface to which a weld is to be made, comprising the steps of placing a small quantity of intermixed particles of ferrous metal and an oxygen-scavenging metal on said surface at the spot to which the weld is to be made, positioning the electrode at a distance from said spot and closing the circuit to apply potential to said electrode and said surface.

14. A method of striking an electric arc while maintaining the end of the electrode spaced from a surface to which a weld is to be made, comprising the steps of placing a small quantity of intermixed steel chippings and aluminum filings on said surface at the spot to which the weld is to be made, positioning the electrode at a distance from said spot and closing the circuit to apply potential to said electrode and said surface.

15. A method of striking an electric arc while maintaining the end of the electrode spaced from a surface to which a weld is to be made, comprising the steps of causing a small quantity of intermixed particles of steel and aluminum to adhere to the end of an electrode, placing said end of the electrode adjacent a surface to which a weld is to be made and closing the circuit to apply potential to said electrode and said surface.

16. A method of striking an electric arc while maintaining the end of the electrode spaced from a surface to which a weld is to be made, comprising the steps of causing a small quantity of intermixed particles of ferrous metal and an oxygen-scavenging metal to adhere to the end of an electrode, placing said end of the electrode adjacent a surface to which a weld is to be made while preventing the establishing of a solid conductive path between the electrode and the said surface and closing the circuit to apply potential to said electrode and said surface.

17. A welding device, comprising a supporting structure, longitudinally adjustable mounting means carried thereby, a cylinder mounted for longitudinal sliding movement in said means, a plunger slidable in said cylinder, releasable means to lock said plunger in said cylinder, means to release said locking means at a pre-determined point of movement of said cylinder in said mounting means, means to move said plunger with respect to said cylinder upon release of said locking means, an electrode holder carried by said plunger, means to supply current to said electrode holder, and means supported by said cylinder to control said current.

18. A welding device, comprising a supporting structure, longitudinally adjustable mounting means carried thereby, a cylinder mounted for longitudinal sliding movement in said means, there being through the wall of said cylinder a longitudinal slot with its upper end enlarged, continuously acting means tending to move said cylinder in one direction in said means, a plunger slidable in said cylinder, an electrode holder carried by said plunger, continuously acting means tending to move said plunger out of said cylinder, means to limit the movement of said plunger in said cylinder, releasable means to lock said plunger in said cylinder, means to release said locking means at a pre-determined point of movement of said cylinder in said supporting means, means to move said plunger with respect to the cylinder upon release of said locking means, and means to supply current to said electrode holder.

19. A welding device, comprising a supporting structure, a cylinder carried by said supporting structure to be longitudinally slidable therein, a plunger slidable in said cylinder, an electrode holder carried by said plunger, means automatically to move said plunger with respect to said cylinder at a pre-determined point of the movement of said cylinder in said supporting structure, and means to supply current to said electrode holder.

20. A welding device, comprising a supporting structure, a cylinder slidably mounted therein, said cylinder having in it a longitudinal slot with an enlarged upper end, a plunger slidable in said cylinder, an electrode holder carried by said plunger, a spring-actuated detent in said plunger adapted to seat in the enlarged end of said slot and brought into registry therewith, a finger mounted to extend into said slot to move said detent out of said enlarged end when brought into contact therewith, and means to supply current to said electrode holder.

21. A welding device, comprising a supporting structure, a cylinder supported thereby to be longitudinally slidable with respect thereto, a plunger slidable in said cylinder, an electrode holder carried by said plunger, means to move automatically said plunger with respect to said cylinder at a predetermined point of the movement of said cylinder, means to supply current to said electrode, and means supported by said cylinder to control said current.

22. A welding device, comprising a supporting structure, a cylinder supported thereby to be longitudinally slidable with respect thereto, there being through the wall of said cylinder a longitudinal slot with its upper end enlarged, continuously acting means tending to move said cylinder in one direction in said means, a plunger slidable in said cylinder, an electrode holder carried by said plunger, continuously acting means tending to move said plunger out of said cylinder, means to limit the movement of said plunger in said cylinder, a spring-actuated detent in said plunger adapted to seat in the enlarged end of said slot when brought into registry therewith, a finger mounted to extend into said slot to move said detent out of said enlarged end when brought into contact therewith, and means to lock an electrode in said electrode holder.

23. A portable device for welding a fastener to a support comprising a tubular member adapted to be manually "spotted" over the point on the support to which the fastener is to be secured, fastener-engaging means movable axially of said member, means for urging said fastener-engaging means toward said support, means normally holding said urging means inactive, and means effective on a predetermined relative movement between said member and said fastener-engaging means for causing said holding means to release said urging means.

24. A portable device for welding fasteners to a support comprising a housing adapted to be disposed manually over the point on the support to which the fastener is to be secured, fastener-engaging means movable axially in said housing, a compression spring adapted to urge said means forward, a detent for holding the spring compressed, and means for tripping the detent on predetermined relative movement of the housing toward the support.

25. A portable device for welding fasteners to a support comprising a barrel, fastener-engaging means movable axially of said barrel, a plunger in the barrel behind said means, a spring in said barrel behind the plunger, a detent for holding the plunger against movement by said spring, and means for tripping the detent on predetermined movement of the barrel toward the support.

JOHN D. CRECCA.
SAMUEL S. SCOTT.